United States Patent
Shimamoto

(10) Patent No.: US 11,181,229 B2
(45) Date of Patent: Nov. 23, 2021

(54) RIGGING LADDER SYSTEM FOR LIGHTING FIXTURES OR ENTERTAINMENT EQUIPMENT

(71) Applicant: SOLID INDUSTRIES, LLC, Burbank, CA (US)

(72) Inventor: Matthew Shimamoto, Burbank, CA (US)

(73) Assignee: SOLID INDUSTRIES, LLC, Burbank, CA (US)

( * ) Notice: Subject to any disclaimer, the term of this patent is extended or adjusted under 35 U.S.C. 154(b) by 28 days.

(21) Appl. No.: 16/776,125

(22) Filed: Jan. 29, 2020

(65) Prior Publication Data
US 2021/0231258 A1    Jul. 29, 2021

(51) Int. Cl.
| F16M 13/00 | (2006.01) |
| F16M 13/02 | (2006.01) |
| F21S 8/04 | (2006.01) |
| F21W 131/406 | (2006.01) |

(52) U.S. Cl.
CPC ........... *F16M 13/022* (2013.01); *F21S 8/043* (2013.01); *F21W 2131/406* (2013.01)

(58) Field of Classification Search
CPC .......... F16M 13/02; F16M 13/00; F21S 8/043
See application file for complete search history.

(56) References Cited

U.S. PATENT DOCUMENTS

| 3,533,502 A | * | 10/1970 | Hansen | A47B 45/00 206/386 |
| 4,940,149 A | * | 7/1990 | Vineis | A47B 47/04 211/186 |
| 5,570,957 A | * | 11/1996 | Kuly | A63B 23/00 384/42 |
| 2018/0142832 A1 | * | 5/2018 | Inouye | A61H 15/00 |
| 2019/0099363 A1 | * | 4/2019 | Fishburn | A61K 47/60 |
| 2019/0126088 A1 | * | 5/2019 | Henniger | A63B 21/4035 |
| 2019/0275363 A1 | * | 9/2019 | Jones | A63B 21/0615 |

\* cited by examiner

*Primary Examiner* — Amy J. Sterling
(74) *Attorney, Agent, or Firm* — Innovation Capital Law Group, LLP; Vic Lin

(57) ABSTRACT

A rigging ladder system for hanging light fixtures or entertainment equipment thereon includes first and second side rails having one or more center members forming an interconnection between the side rails. A lifting plate may span between the side rails at a top side thereof for lifting the system to a desired height. The system can be formed from one or more assemblies such that a desired vertical length achieved that can hold the desired number of lighting fixtures by interconnecting an appropriate number of assemblies together. The width may be adjustable by choosing center members of the desired width. The rigging ladder system, or lighting torm, may be adjusted vertically and horizontally depending user needs and the specific application.

15 Claims, 4 Drawing Sheets

RIGGING LADDER SYSTEM FOR LIGHTING FIXTURES OR ENTERTAINMENT EQUIPMENT

BACKGROUND OF THE INVENTION

1. Field of the Invention

Embodiments of the invention relate generally to entertainment equipment. More particularly, embodiments of the invention relate to a modular rigging ladder system, such as a modular lighting torm, that allows one or more lighting support assemblies to be linked in series.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Lighting for theaters, concert venues, or the like an be positioned at various locations, relative to the stage. Front of house lighting may be hung from battens or trusses above the audience. Electrics may be hung from battens or trusses above the stage itself. Torm lighting, also known as juliets or tormentors, are usually formed from a series of pipes downstage left and downstage right, typically between the transitions between stage and audience. Torm lighting is typically not as high as front of stage lighting or electrics. Depending on stage configuration, theater layout, or arena design, the vertical length of the torm may ideally be changed from venue to venue. However, conventional torm lighting systems may be difficult to adjust and customize, often resulting in a single sized and shaped torm lighting system to be used, even at different venues.

Further, because lighting is often hung above performers or an audience, there is a need to ensure proper design strength and secure attachment of such lighting systems.

In view of the foregoing, there is a need for improved torm lighting that addresses these and other shortcomings of conventional lighting.

SUMMARY OF THE INVENTION

Embodiments of the present invention provide a rigging system comprising first and second side rails, each having a first end and a second end opposite the first end; a plurality of rail side holes formed along an inner side of each of the first and second side rails; a plurality of rail front holes formed along a front side of each of the first and second side rails; a first end connector attached to the first end; a second end connector attached to the second end; a center rail spanning between the first and second side rails, wherein the first end connector is configured to removably attach to the second end connector to permit a desired number of first and second side rails to interconnect end to end.

Embodiments of the present invention further provide a rigging system comprising first and second side rails, each having a first end and a second end opposite the first end; a plurality of rail side holes formed along an inner side of each of the first and second side rails; a plurality of rail through holes formed through a front side and a rear side of each of the first and second side rails; a plurality of slots formed along an outer side of each of the first and second rails; a first end connector attached to the first end; a second end connector attached to the second end; a center rail spanning between the first and second side rails; and a bracket disposed at each end of the center rail, each bracket having at least one plate disposed along the inner side of the first and second rails; an inner plate hole formed through the inner plate, wherein the first end connector is configured to removably attach to the second end connector to permit a desired number of first and second side rails to interconnect end to end; and the inner plate hole configured to receive a fastener therethrough and into one of the plurality of rail side holes, where the fastener terminated within the first and second side rails and is accessible through the plurality of slots.

Embodiments of the present invention also provide a rigging system comprising first and second side rails, each having a first end and a second end opposite the first end; a plurality of rail side holes formed along an inner side of each of the first and second side rails; a plurality of rail through holes formed through a front side and a rear side of each of the first and second side rails; a plurality of slots formed along an outer side of each of the first and second rails; a first end connector attached to the first end; a second end connector attached to the second end; and a center rail spanning between the first and second side rails.

In some embodiments, the rigging system includes first and second brackets having a first side disposed adjacent the inner side of the first and second side rails and a second side disposed adjacent one of the front side or the rear side of the first and second side rails, the first and second brackets supporting the center rail at each end thereof.

In some embodiments, the rigging system includes a first side hole in the first side for passing a first fastener through and into the first and second rails; and a second side hole in the second side for passing a second fastener therethrough and through the first and second rails.

In some embodiments, the first side hole is longitudinally offset from the second side hole.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
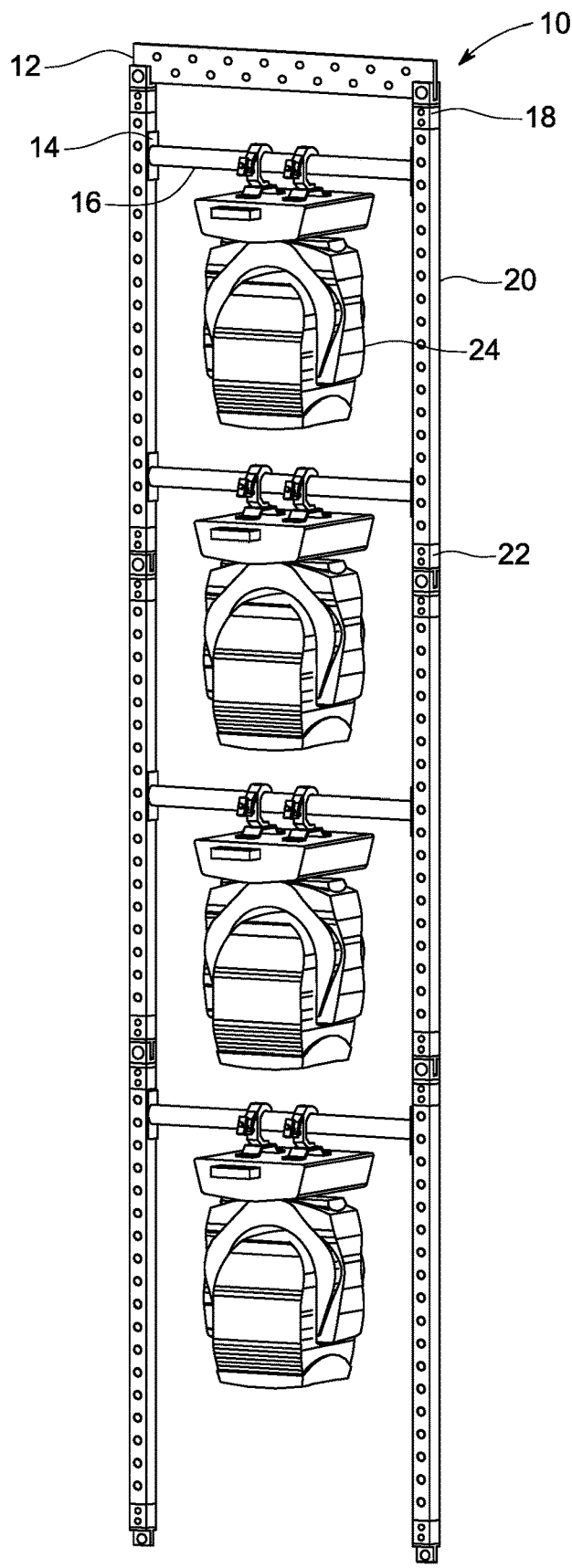
FIG. 1 illustrates a front view of an exemplary embodiment of a lighting torm formed from a plurality of lighting torm assemblies, having lights mounted thereon.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any device, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a rigging ladder system for hanging light fixtures or entertainment equipment thereon. The system includes first and second side rails having one or more center members forming an interconnection between the side rails. A lifting plate may span between the side rails at a top side thereof for lifting the system to a desired height. The system can be formed from one or more assemblies such that a desired vertical length achieved that can hold the desired number of lighting fixtures by interconnecting a desired number of assemblies. The width may be adjustable by choosing center members of the desired width. The rigging ladder system, or lighting torm, may be adjusted vertically and horizontally depending user needs and the specific application.

As used herein, the term "lighting torm" may refer to the structure described below for the rigging ladder system and, while term references lighting, such a structure may be used for a variety of purposes, including lighting or other entertainment equipment, for example.

Referring now to FIGS. 1 through 4, a rigging ladder system 10, also referred to as a lighting torm 10, can include side rails 20 interconnected at a top end thereof by a lifting plate 12. A center member can include brackets 14 with a center rail 16 spanning therebetween. The brackets 14 may be configured to engage and securely and removably attach to the rails 20 as described in greater detail below.

Each side rail 20 can include a first end connector 18 and a second end connector 22 attached to opposite ends of each side rail 20. In some embodiments, the first end connector 18 may be a male connector, having a single flat extension, as described in greater detail below. In some embodiments, the second end connector 22 may be a female connector, having two flat extensions, as described in greater detail below, into which the first end connector 18 fits. Such end connectors 18, 22 may be known in the art as fork ends. Holes through the first end connector 18 and the second end connector 22 may align to permit a bolt, pin, or the like to extend through to interconnect the end connectors 18, 22.

Figure 2:
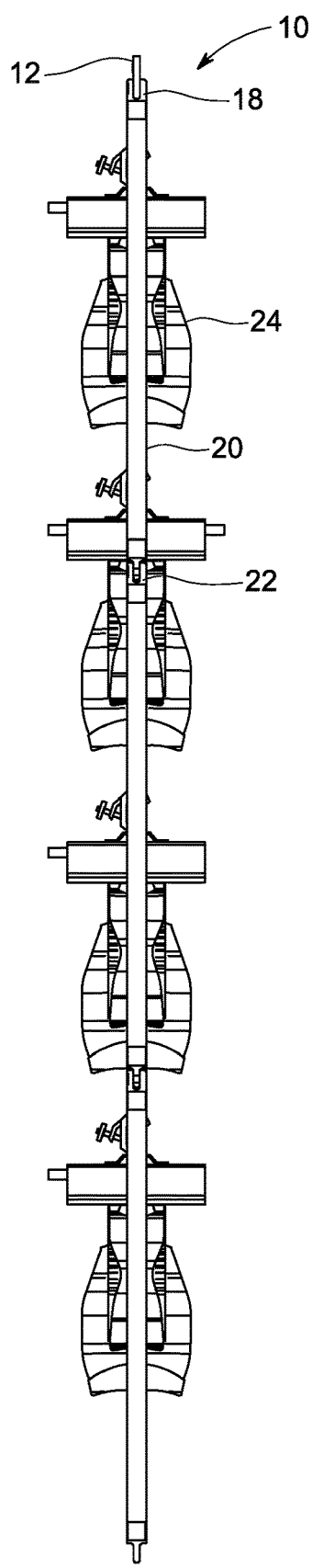
FIG. 2 illustrates a side view of the lighting torm of FIG. 1.

Lighting fixtures 24 may be hung at any location along the center rail 16. As shown in FIGS. 1 and 2, three lighting torm assemblies are interconnected together by end connectors 18, 22, where the top two light torm assemblies include two center rails 16, each having a lighting fixture 24 hanging therefrom. Depending on the specific application, any number of center rails 16 16 may span between side rails 20 of each lighting torm assembly, provided, of course, that at least one center rail 16 spans between the side rails 20 for each of the lighting torm assemblies forming the lighting torm 10.

In some embodiments, the side rails 20 may be formed in a rectangular shape, such as a square shape. Of course, other shapes may also be effective, depending on application. In some embodiments, the side rails 20 may be formed from square aluminum tubing having dimensions of 2" by 2" by ¼ inch thick. The lifting bar 12 may from formed from aluminum plating material and, in some embodiments, may be ⅝ inch thick and about 4 inches high. The center rail 16 may be formed in various shapes, including round and square, for example. In some embodiments, the center rail 16 may be formed of 1.5 inch schedule 40 tubing. A lighting torm 10 formed according to the specific dimensions described above, may be suitable for lifting at least 160 pounds on each center rail and a total of 200 pounds for each lighting torm assembly.

The lifting bar 12, as described above with reference to FIG. 1, may be used to provide pick points for raising the rigging system once assembled. As shown in FIG. 1, multiple holes may be formed in the lifting bar 12 and the lifting bar 12 may be attached to the first end connector 18 with a bolt, for example. Typically, the lifting bar 12 has a width that spans between the side rails 20. In some embodiments, the lifting bar 12 may be used to interconnect a first rigging assembly, having a first width, to a second rigging assembly having a second, different width. In other words, the lifting bar 12 may be used in the middle of a rigging system to change the width between side rails 20 of adjacent rigging assemblies along the length of the rigging system.

Figure 5:
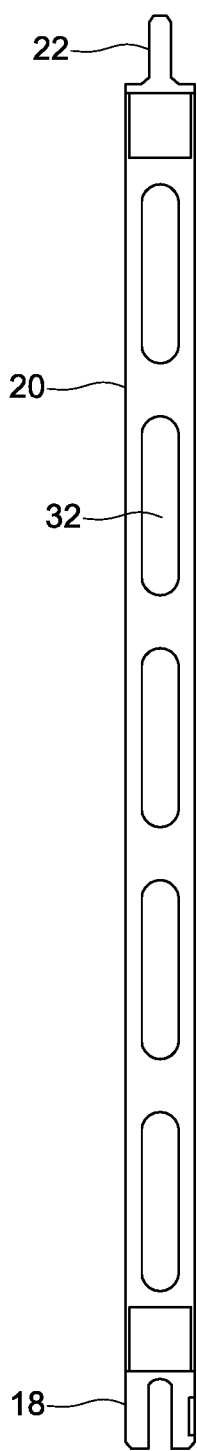
FIG. 5 illustrates a detailed outer side view of a rail of one of the plurality of lighting torm assemblies of FIG. 3.
Figure 6:
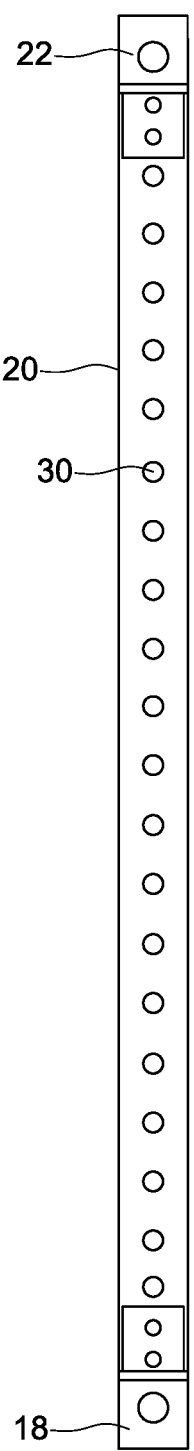
FIG. 6 illustrates a detailed front view of a rail of one of the plurality of lighting torm assemblies of FIG. 3.
Figure 7:
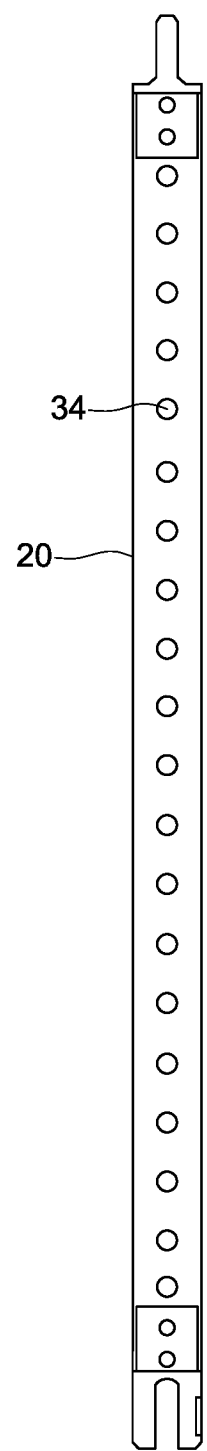
FIG. 7 illustrates a detailed inner side view of a rail of one of the plurality of lighting torm assemblies of FIG. 3.

Referring to FIGS. 5 through 7, views of the side rail 20 a single lighting torm assembly are shown. In FIG. 5, an outer side view of the side rail 20 is shown. The outer side of the side rail 20 can include a plurality of elongated slots 32. It should be noted that the bolt holes 34, on the inner side of the side rail 20 (see FIG. 7) would be visible through the elongated slots 32 but are not shown for clarity. Typically, the elongated slots 32 are from 6 to 8 inches in length, spanning from about 3 to 5 of the bolt holes 34, however, the length of the slot may vary according to application but should be configured to span at least two bolt holes for securement of the central member bracket, as discussed below.

FIG. 6 illustrates a front view of the side rail 20 of a single lighting torm assembly. Bolt holes 30 may be positioned along the length of the side rail 20, where the bolt holes 30 can extend through the front side (as shown in FIG. 6) of the side rail 20 and extend to the back side of the side rail 20. In other words, the bolt holes 30 can extend entirely through the side rail 20, from front to back, generally orthogonal to a longitudinal (length-wise) axis of the side rail 20.

FIG. 7 illustrates an inner side view of the side rail 20 of a single lighting torm assembly. Bolt holes 34 can extend through the inner side of the side rail 20. The bolt holes 34, as shown, can be positioned along the length of the side rail 20. In some embodiments, the bolt holes 34 may only extend through the inner side of the side rail 20, where the slots 32 (see FIG. 5) provide access to a fastener that extends through bolt holes 34.

The bolt holes 30, 34 may be equally spaced along the length of the side rail 20. The spacing between the bolt holes 30, 34 may vary, but, typically the spacing would be from 1 to 3 inches apart, often about 2 inches apart. In some embodiments, the bolt holes 30 may be positioned at an equal distance from one end of the side rail 20 as the corresponding bolt holes 34. In other words, the bolt holes 30 may align with the bolt holes 34 such that a line passing through one bolt hole 30 and a corresponding bolt hole 34 may be orthogonal with the longitudinal axis of the side rails 20. In other embodiments, the bolt holes 30, 34 may be offset from one another.

Figures 8, 9:
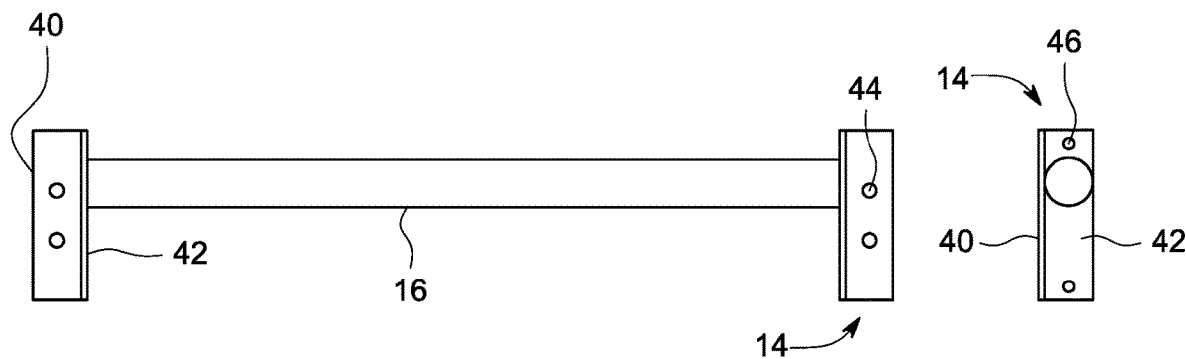
FIG. 8 illustrates a front view of a cross member disposed between the rails of the lighting torm assembly of FIG. 3.
FIG. 9 illustrates an end view of the cross member of FIG. 8.
Figures 10, 11:
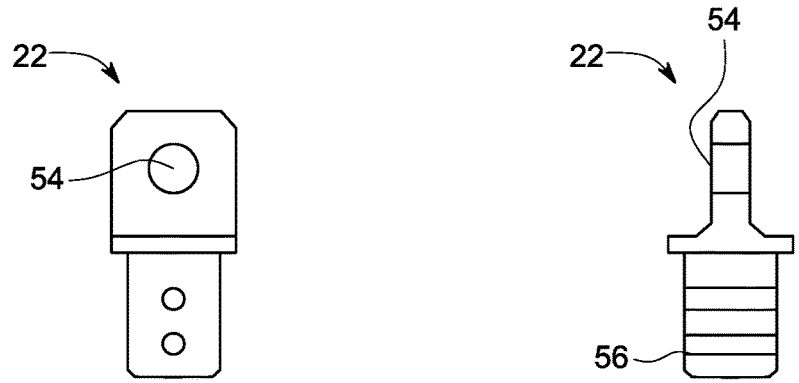
FIG. 10 illustrates a detailed front view of a first end connector of the lighting torm of FIG. 3.
FIG. 11 illustrates a side view of the first end connector of FIG. 10.

Referring now to FIGS. 8 and 9, the center rail assembly is shown in detail. The center rail assembly includes brackets 14 on each end of a center rail 16. In some embodiments, as shown in FIGS. 8 and 9, the brackets 14 may be L-shaped, formed from an inside member 42 and an outside member 40. The inside member 42 can include inside member bolt holes 46 that may align with corresponding ones of the bolt holes 34 formed on an inner side of the side rail 20. The outside member 40 may extend outward from the inside member 42 (relative to the position of the center rail 16) and may include outside member bolt holes 44. The outside member bolt holes 44 may align with corresponding ones of the bolt holes 30 on a front side of the side rail 20 (as well as identically spaced bolt holes (not shown) on the back side of the side rail 20).

Figure 3:
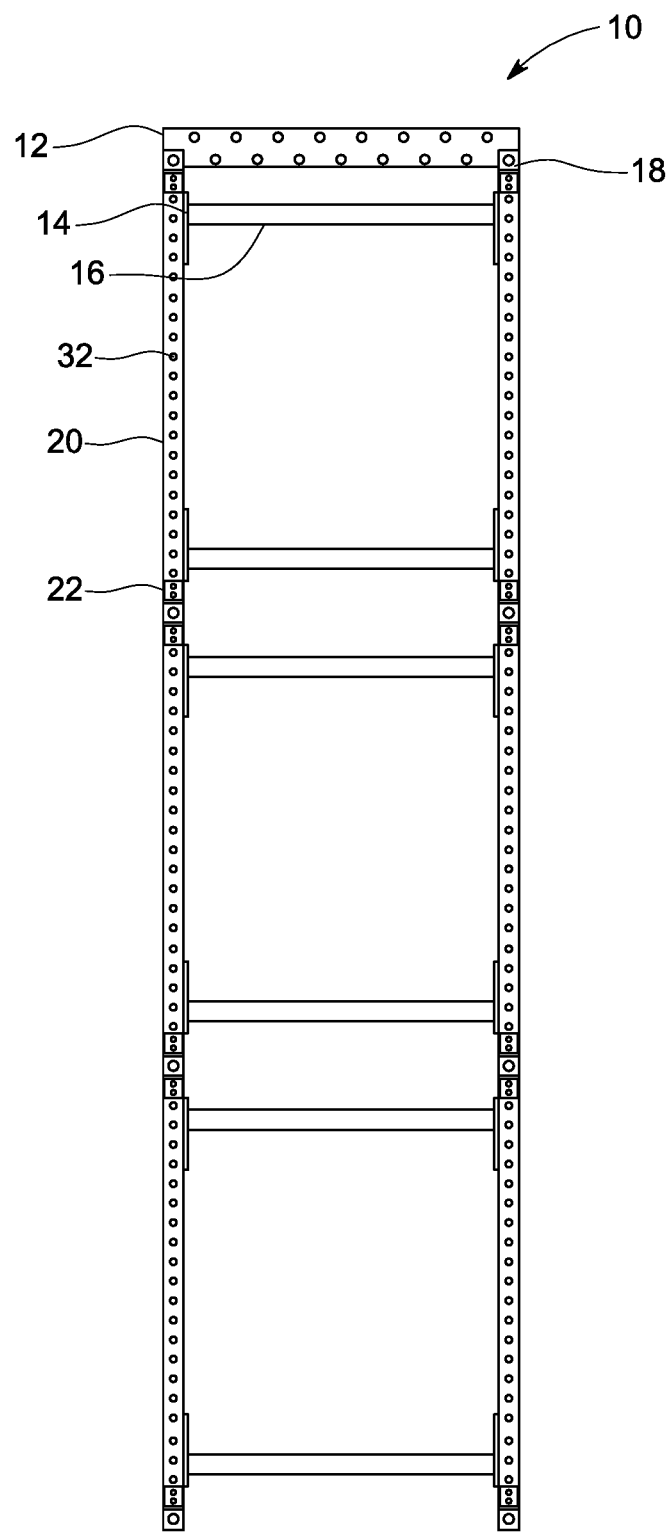
FIG. 3 illustrates a front view of the lighting torm, formed from a plurality of lighting torm assemblies, of FIG. 1, without the lights mounted thereon.
Figure 4:
FIG. 4 illustrates a side view of the lighting torm of FIG. 3.

The center rail assembly as shown in FIG. 8 may be positioned between two side rails 20 as shown in FIGS. 1 through 3. Fasteners (not shown), such as bolts, may extend through the outside member bolt holes 44 and through bolt holes 30 to extend out a back side of the side rail 20. Securement members, such as nuts, may attach to the end of the fastener extending out the back side of the side rail 20. Further, additional fasteners (not shown), such as bolts, may extend through the inside member bolt holes 46 and through the bolt holes 34 in the inner side of the side rail 20. Securement members, such as nuts, may attach to the end of the fasteners. In some embodiments, the nuts may be disposed inside the side rail 20 and the bolts and nuts may not extend beyond an outer edge of the side rail 20. Access to the nuts may be provided via the slots 32 (see FIG. 5) formed along the outside edge of the side rail 20.

The center rail 16 may be attached to the brackets 14 by various manners known in the art. In some embodiments, the center rail 16 may be welded to the brackets 14. In some embodiments, a hole may be cut in the outside member 42, where the dimensions of the hole match the outside dimensions of the center rail 16. The center rail 16 may fit into the hole to be secured between corresponding pairs of brackets 14. In this embodiment, the center rail 16 may be welded into position so that the center rail 16 is supported not only by the hole in the brackets 14, but also by the weld provided between the center rail 16 and the brackets 14. As noted above, while the center rail 16 is shown as having a circular cross-section, other cross-sectional shapes, such as rectangular or square, for example, as contemplated within the scope of the present invention.

The center rail 16 may be configured in various lengths, where a user can choose specific ones of the center rails to create a rigging system that is of a desired width. As discussed above, multiple ones of the rigging assemblies (which include the pair of side rails 20 with at least one center rail 16 spanning therebetween) may be chained together to provide a rigging system that is of the desired length.

Referring to FIGS. 10 through 13, the first end connector 18 and the second end connector 22 are shown in detail. It should be understood that FIGS. 10 through 13 are representative as one possible example for the interconnection of the side rails 20 and other methods may be used within the scope of the present invention. The first end connector 18 may be a two prong fork connector having a connector hole 52 and bolt holes 58 formed therethrough. The bolt holes 58 may be used to affix the first end connector 18 to an end of the side rail 20. Other securement methods, such as welding or integral formation with the side rail, may be used to provide the fork end.

Figures 12, 13:
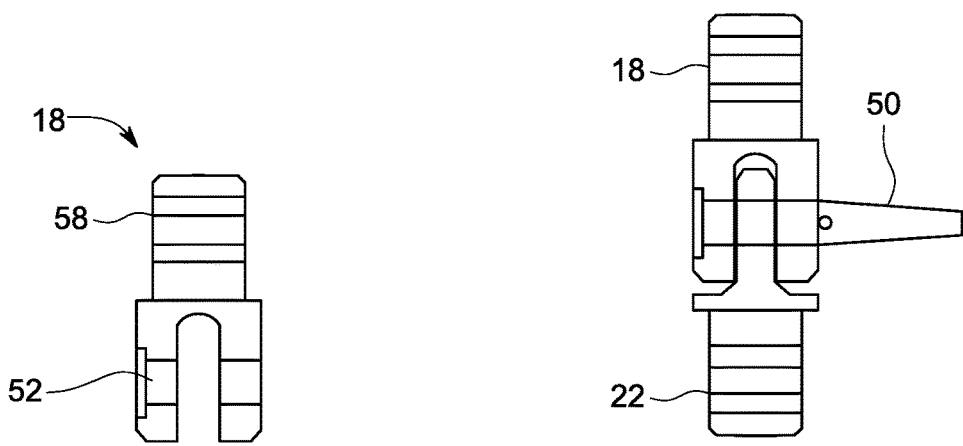
FIG. 12 illustrates a detailed front view of a second end connector of the lighting torm of FIG. 3.
FIG. 13 illustrates a detailed view of the first end connector and the second end connector engaged together.

The second end connector 22 may include a connector hole 54 that can align with the connector 52 for receiving a connector 50 therethrough. Bolt holes 56 may be used to affix the second end connector 22 to an end of the side rail 20. Similar to the first end connector 18, the second end connector 22 may be secured by other securement methods. In some embodiments, when the connectors 18, 22 are joined together, as shown in FIG. 13, the side rails 20 (not shown, but extending from opposite ends of the connectors 18, 22) may pivot about an axis provided by the connector 50.

The bolts and connectors described herein may be designed for the suitability of the particular system being designed. Typically, bolts and connectors may be formed from hardened steel, such as grade 5 or grade 8 hardened steel.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A rigging system comprising:
   first and second side rails, each having a first end and a second end opposite the first end;
   a plurality of rail side holes formed along an inner side of each of the first and second side rails;
   a plurality of rail front holes formed along a front side of each of the first and second side rails;
   a first end connector attached to the first end;
   a second end connector attached to the second end;
   a center rail spanning between the first and second side rails, wherein the first end connector is configured to removably attach to the second end connector to permit a desired number of first and second side rails to interconnect end to end;
   the first end connector includes two parallel plates, having a space therebetween, with a first connector hole therethrough; and
   the second end connector includes a single plate configured to fit between the two parallel plates of the first end connector, the single plate having a second connector hole therethrough that aligns with the first connector hole when the single plate is fitted in the space.

2. The rigging system of claim 1, further comprising a lifting bar configured to attach to the first end connectors on the first end of each of the first and second side rails.

3. The rigging system of claim 1, further comprising first and second brackets disposed on opposite ends of the center rail, the first and second brackets removably attachable to the first and second rails.

4. The rigging system of claim 3, wherein the first and second brackets are L-shaped brackets, with a first side disposed adjacent an inner side of the first and second side rails and a second side disposed adjacent one of a front or a back side of the first and second side rails.

5. The rigging system of claim 4, further comprising:
   a first side hole in the first side for passing a first fastener through and into the first and second rails; and
   a second side hole in the second side for passing a second fastener through and into the first and second rails.

6. The rigging system of claim 5, further comprising at least two first side holes and at least two second side holes.

7. The rigging system of claim 5, wherein the first side hole is longitudinally offset from the second side hole.

8. The rigging system of claim 5, wherein the first fastener passes through the first side hole and terminates inside the first and second rails without extending out of an outer side of the first and second rails.

9. The rigging system of claim 8, further comprising slots cut into the outer side of the first and second rails, the slots providing access to the first fastener after passing through the first side hole and the rail side hole.

10. The rigging system of claim 1, further comprising a first center rail having a first length and a second center rail having a second length longer than the first length, wherein a user is able to select one of the first center rail and the second center rail to provide a desired space between the first and second rails.

11. A rigging system comprising:
    first and second side rails, each having a first end and a second end opposite the first end;
    a plurality of rail side holes formed along an inner side of each of the first and second side rails;

a plurality of rail through holes formed through a front side and a rear side of each of the first and second side rails;

a plurality of slots formed along an outer side of each of the first and second rails;

a first end connector attached to the first end;

a second end connector attached to the second end;

a center rail spanning between the first and second side rails; and a bracket disposed at each end of the center rail, each bracket having at least one plate disposed along the inner side of the first and second rails;

an inner plate hole formed through the inner plate, wherein the first end connector is configured to removably attach to the second end connector to permit a desired number of first and second side rails to interconnect end to end; and the inner plate hole configured to receive a fastener therethrough and into one of the plurality of rail side holes, where the fastener terminated within the first and second side rails and is accessible through the plurality of slots.

12. The rigging system of claim 11, further comprising a lifting bar configured to attach to the first end connectors on the first end of each of the first and second side rails.

13. The rigging system of claim 11, wherein the first and second brackets are L-shaped brackets, with the at least one plate disposed adjacent the inner side of the first and second side rails and a second plate disposed adjacent one of a front or a back side of the first and second side rails.

14. The rigging system of claim 13, further comprising:

a second plate hole in the second plate for passing a second fastener through and into the first and second rails.

15. The rigging system of claim 14, wherein the inner plate hole is longitudinally offset from the second plate hole.

* * * * *